S. W. TYLER.
Potato-Diggers.
No. 141,903.
2 Sheets--Sheet 1.
Patented August 19, 1873.
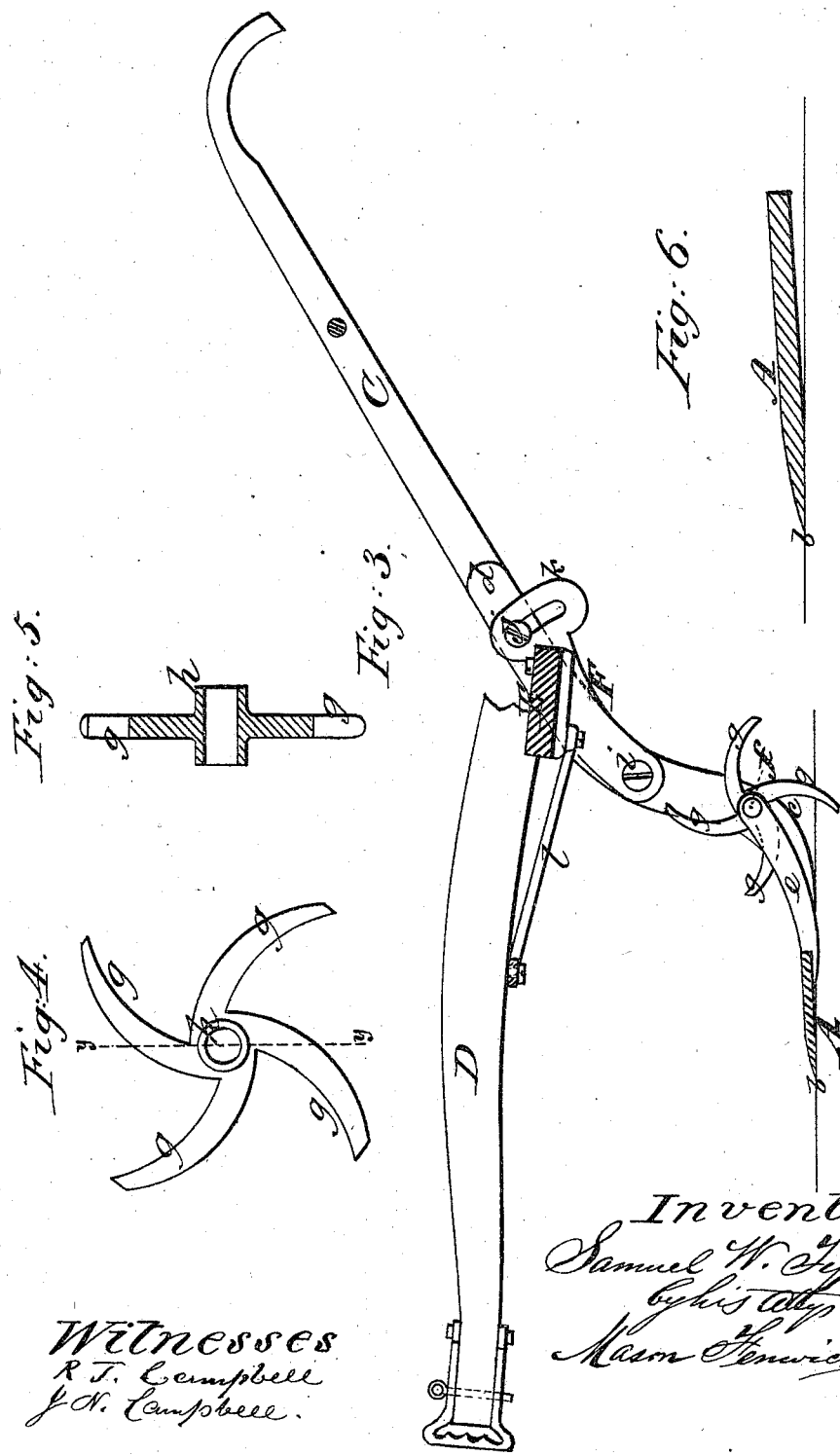
Witnesses
R. J. Campbell
J. N. Campbell
Inventor
Samuel W. Tyler
by his atty
Mason Fenwick Lawrence 2 Sheets--Sheet 2.
S. W. TYLER.
Potato-Diggers.
No. 141,903.   *Fig: 1.*   Patented August 19, 1873.
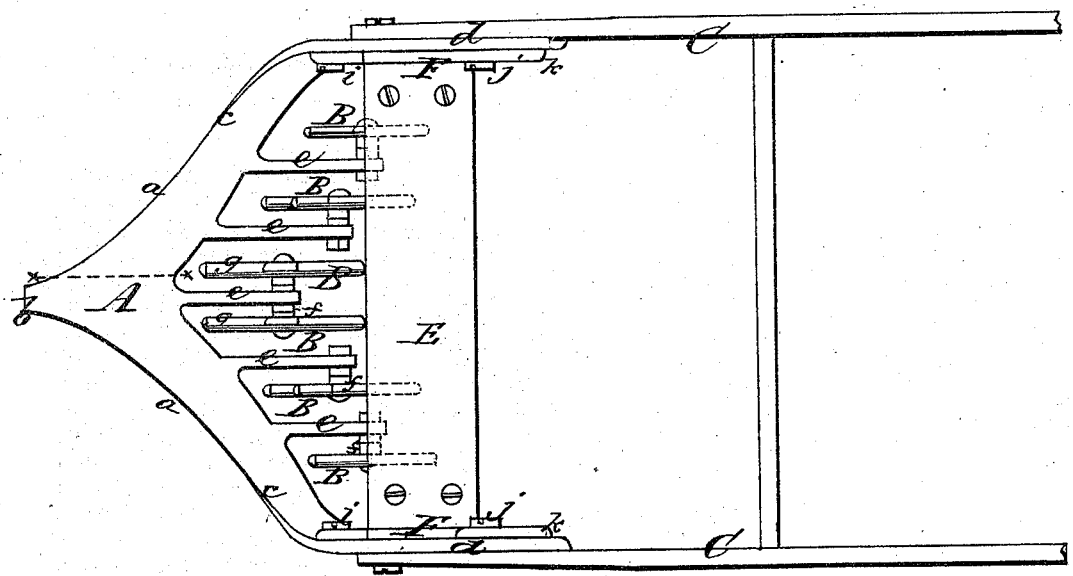
*Fig: 2.*
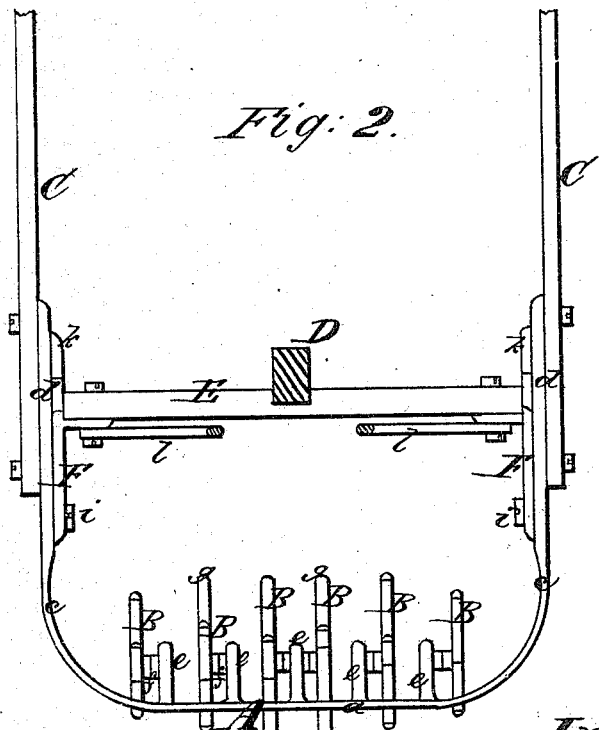
Witnesses.
R. T. Campbell.
J. N. Campbell.
Inventor
Samuel W. Tyler
by his Attys
Mason Fenwick Lawrence

UNITED STATES PATENT OFFICE.

SAMUEL W. TYLER, OF TROY, NEW YORK.

IMPROVEMENT IN POTATO-DIGGERS.

Specification forming part of Letters Patent No. 141,903, dated August 19, 1873; application filed August 6, 1873.

*To all whom it may concern:*

Be it known that I, SAMUEL W. TYLER, of Troy, in the county of Rensselaer and State of New York, have invented a new and useful Improvement on Potato-Diggers; and I do hereby declare that the following is a full, clear, and exact description thereof, reference being had to the accompanying drawings making part of this specification, in which—

Figure 1 shows a top view of the potato-digger without the draft-pole or tongue; Fig. 2, a cross-section looking from the front of the same, with the draft-pole attached; Fig. 3, a longitudinal section of the same with the draft-pole or tongue attached; Fig. 4, an elevation, and Fig. 5 a section, of one of the rotary diggers; Fig. 6, an enlarged section of the entering-blade taken in line $x\ x$ of Fig. 1.

Similar letters of reference indicate corresponding parts in the several figures.

The nature of my invention consists, first, in the construction of the blade which conducts the diggers through the hills of potatoes, said construction being such that the earth containing the potatoes is simply sliced from the bed of earth below, and thus presented to the diggers before it is forced aside, or so elevated as to be broken into fragments; second, in the entering-blade for potato-digging machines, which conducts the diggers into the ground, made to be tilted independently of the draft device while being drawn along through the soil, and is controlled by handles, whereby the blade can be made to enter deep or shallow, as desired, independently of any change in the position of the draft device; third, in rotary diggers, which are constructed to dig the potatoes without holding upon and carrying up the soil or becoming entangled with the vines, weeds, and other obstructions, such diggers consisting of curved arms extending out from a hub, and moving with said hub in a reverse direction to their concavity, or backward, so as to shed the substances with which they come in contact in their revolution.

To enable others skilled in the art to make and use my invention, I will proceed to describe its construction and operation.

A represents the entering-blade; B, rotary diggers hung on axles some distance in rear of the blade. C C are handles, to which the blade is firmly and rigidly bolted. D is a draft-pole or tongue; E, a cross-beam or draft-bar; and F F, hounds, by which the draft device D E is coupled to the blade and handles.

My entering-blade is designed to perform a different office from that usually performed by mold-boards, plowshares, and scoops heretofore used. It is to simply serve as a gage to conduct diggers into the soil which contains the potatoes, holding them steadily to their work at any desired depth, and protecting them from damage by obstructions, whereas in other potato-diggers the blade does the work of digging, breaking up the soil, and, in some instances, depositing it with the potatoes upon separators or shakers.

My blade A, therefore, is made of uniformly low grade or flat construction longitudinally, and rises out of the ground in gradually curved lines laterally. It is also made as narrow and thin as possible with a proper regard to strength. Its flat, narrow, and thin construction are resorted to in order to adapt it for passing through the soil with the least possible resistance of the same, and thereby to insure its slicing off the hill of potatoes without plowing, turning out the soil, and breaking up the same, or, in other words, without digging the potatoes and sloughing or piling up the soil, vines, &c., in front and on both sides of the center of the machine. This blade in cross-section should be in about the form represented in Fig. 6—that is, its top and bottom flat, excepting at the cutting-edge, where a slight bevel is given to it to form the cutting-edge. Viewed from the top, the cutting portion of the blade is very similar in form to the letter V, and its front edge $a\ a$ runs back from the point $b$, both right and left, in laterally oblique directions parallel with the horizon, to near the sides of the implement, where it rises on a slight curve, $c$, and then runs backward and upward in nearly straight lines, the straight portions forming stout shanks $d\ d$, which serve as the means by which to connect the blade to the handles C C.

The profile of the blade and shanks in side elevation is very similar in form to a *cyma reversa*, with its termini extended in straight lines.

As one of many ways in which the rotary diggers may be supported in rear of the blade, I have formed narrow tines e e on the blade. These extend backward out of the rear edge of the blade; they are all nearly of the same length; but as they project from the oblique rear edge of the blade, they terminate, one beyond another, on either side of the center of the blade. Each tine at its extremity, on either side of the central one, has a short axle, f, projecting from it, said axle being at right angles to the side of the tine. The central tine has two short axles—one on each side. Upon these short axles the rotary diggers are hung to revolve, being set so as to strike the earth and enter it, the weight of the machine and the resistance of the soil insuring their rotation. The rotary diggers consist each of a series of curved arms, g g, and a central hub, h, as shown in Figs. 4 and 5.

It should be observed that the convex curved side of the arms are set to come upward when they are rising out of the ground, and to go downward or under when they are entering the ground.

The hounds F F are made with horizontal flanges or brackets, upon which the ends of the cross-beam E are placed and firmly bolted. Below and forward of these brackets, as also in rear and above the same, the hounds are extended in a curved form, so as to correspond to the form of the shanks of the blade, and their front ends are pivoted loosely to the inner side of the shanks of the blade, as indicated at i i, while their rear ends are coupled to the said shanks on the same side by means of set-screws j j and slotted enlargements k k of the hounds. The slots in these enlargements are concentric with the pivots i i in order that the blade, while being adjusted on the pivots for shallow or deep entrance into the soil, shall not be restrained by the set-screw, while the screw and slotted enlargements serve as guiding and controlling devices in the adjustment of the entering-blade. The enlargements and extensions of the hounds, in connection with the metallic shanks of the blade, insure a very firm and steady implement, notwithstanding the blade, handles, and draft device are united together so as to swing upon pivots i i. The draft-pole and cross-beam are stayed by diagonal braces l l, which are applied in the manner shown, or in any other convenient manner. The two series are geared together, as shown, and the bearings of the shafts supported in extended side hangers, and by a central tine or bracket.

The set-screws may be set up so as to make the digger and handle rigged with the draft device whenever desired; but the general way of using the implement is to have the blade free for adjustment independent of the draft device.

My potato-digger is exceedingly light and strong, and conveniently managed by a man walking behind it, and it digs potatoes, whether shallow or deep, without becoming clogged, and without cutting or injuring them.

While I prefer to construct the edge of my blade acutely angular, as represented in the accompanying drawings, I do not confine myself strictly to this form, as its cutting-edge may be made circular, or transversely straight, or in any other suitable manner, without changing the principle of its operation.

Having described my invention, what I claim as new, and desire to secure by Letters Patent, is—

1. A narrow slicing-blade, A, which serves as a gage, in combination with sectional diggers, which are arranged to follow, substantially as described.

2. An entering-blade for potato-digging machines which is made to tilt independently of the draft device while being drawn along through the soil, in combination with controlling handles, substantially as described.

3. Rotary diggers which consist of bent arms extending from a central hub, and are arranged to dig potatoes by bringing the convex or highest side of the arms in contact with the earth and potatoes, substantially as described.

SAMUEL W. TYLER.

Witnesses:
J. N. CAMPBELL,
EDM. F. BROWN.